(No Model.)
G. R. EVANS.
AMALGAMATION OF PRECIOUS METALS.
No. 502,902. Patented Aug. 8, 1893.
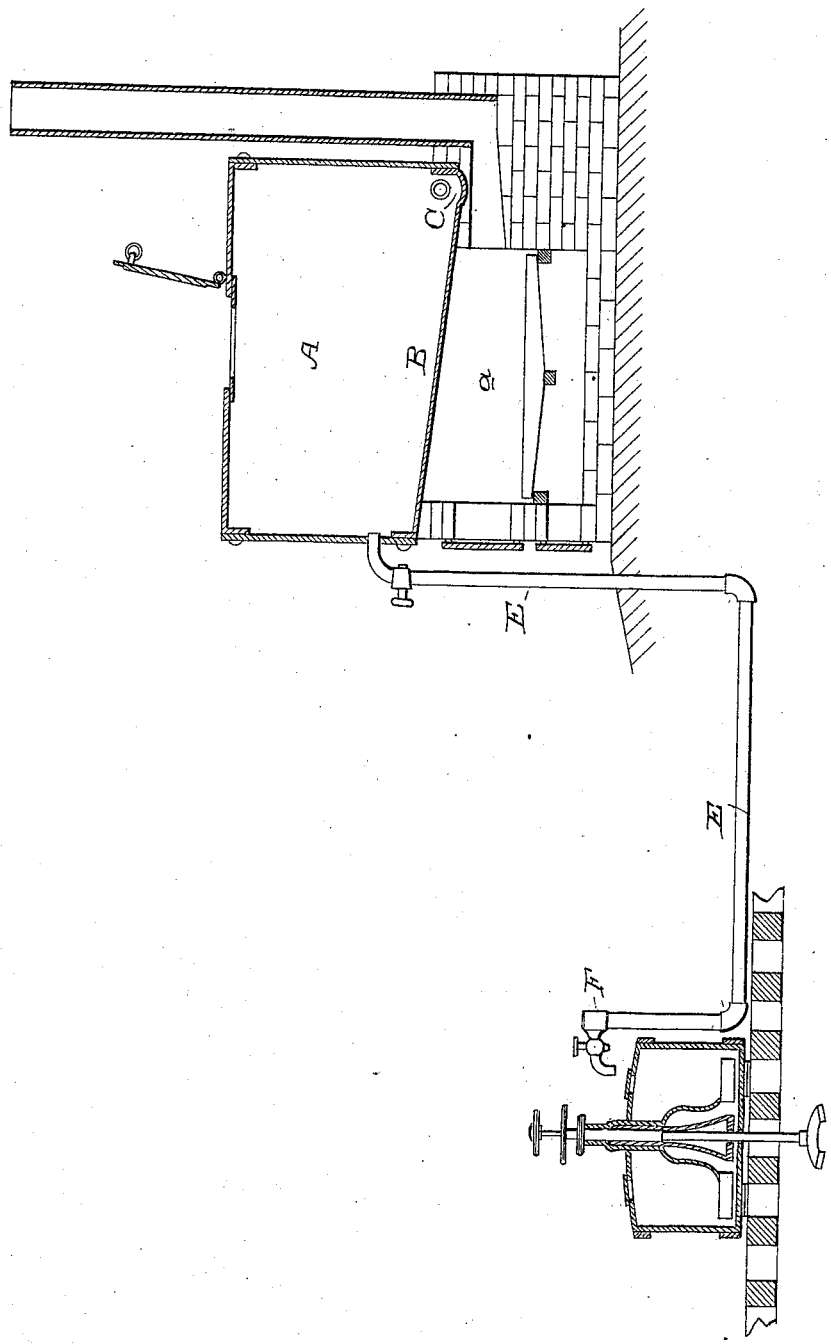
Witnesses,
*[signature]*
*J. A. Bayless*
Inventor,
*George R. Evans*
*By Dewey & Co.*
*Attys*

UNITED STATES PATENT OFFICE.

GEORGE R. EVANS, OF SAN FRANCISCO, CALIFORNIA, ASSIGNOR OF ONE-HALF TO BENEDICT ZEHNDER, OF SAME PLACE.

AMALGAMATION OF PRECIOUS METALS.

SPECIFICATION forming part of Letters Patent No. 502,902, dated August 8, 1893.

Application filed August 12, 1892. Serial No. 442,925. (No model.)

*To all whom it may concern:*

Be it known that I, GEORGE R. EVANS, a citizen of the United States, residing in the city and county of San Francisco, State of California, have invented an Improvement in the Amalgamation of Precious Metals; and I hereby declare the following to be a full, clear, and exact description of the same.

My invention relates to an improved metallurgical process and apparatus for the treatment of ores containing valuable precious metals.

It consists in details of construction which will be more fully explained in the following specification.

In carrying out my process I use a simple apparatus which is illustrated in the accompanying figure of the drawing.

The distinguishing feature of this process consists of the introduction into the amalgamating pans of a mixture composed essentially of lime, carbonate of soda and oil or other unctuous matter.

In carrying out my invention I have found that a proportion of two parts of soda, one part of unslaked lime, eight parts of water, and about one part of oil or other unctuous matter is very suitable for the purpose, but it will be manifest that these proportions may be changed without materially altering the character of the compound.

For effecting the admixture of the above ingredients various devices may be employed. In the present case I have shown an iron tank A with a furnace *a* beneath; the tank being filled with water and heat applied until the water is brought to a boiling temperature. Lime and soda are then added and the oleaginous substance introduced, the whole forming a chemical union of soapy consistency. The bottom B of this tank is preferably made inclined and has a depression C into which the sediment and heavier substances will settle, and from which they can be drawn off by a discharge cock or gate from time to time.

E is a pipe leading out from the opposite side of the tank and extending along within convenient reach of the amalgamating pans or tubs, and adapted to carry the clear liquid. Branch pipes F extend from this pipe to each of the pans, each having a controlling cock whereby the quantity of material delivered to each pan is regulated. By the introduction of this saponaceous liquid into the pan where amalgamation of precious metals is to take place, the mercury is kept bright and clean so that it readily unites with all the particles of the precious metals which are brought into contact with it, and it thus enables me to recover a high percentage of the precious metal contained in the ore. The quicksilver is also prevented from becoming floured and carried off and a great saving is accomplished in this manner.

In many of the mills during the process of amalgamation, a considerable quantity of sulphate of copper is introduced into the amalgamating pans to facilitate the work. As a consequence the bullion turned out at these mills is greatly vitiated by the presence of this base salt, the removal of which in parting the bullion, is attended with considerable expense and trouble. The copper also acts to foul the mercury to a considerable extent and thus diminish its amalgamating power. In my process I am enabled to dispense entirely with the use of copper or other base salt.

The flouring of mercury is generally due either to the presence of base metals which render the mercury impure, or to the adhesion of foreign matter to the surface of the separate globules, after they have become separated by mechanical means. This soapy solution probably acts mechanically like a lubricant in preventing an adhesion of the earthy film which keeps the particles of mercury apart, and by this action it will cause them to coalesce more rapidly whenever they come into contact as they constantly do by the action of the stirrers within the pan.

Having thus described my invention, what I claim as new, and desire to secure by Letters Patent, is—

1. The process of recovering precious metals from their ores, consisting in introducing a saponaceous compound into the amalgamating pans with the pulp and mercury, substantially as herein described.

2. The process of recovering precious metals from their ores consisting in introducing into the amalgamating pans with the pulp and mercury the compound consisting of soda, lime and an oleaginous substance, substantially as herein described.

3. The apparatus consisting of a tank having an inclined bottom with a depression and discharge cock at one side, a furnace whereby the contents of the tank are heated, a pipe leading from the side of the tank opposite the depression and having branch discharge pipes and cocks leading to the amalgamating pans whereby the contents of the tank may be drawn off and delivered to the pans, substantially as herein described.

In witness whereof I have hereunto set my hand.

GEORGE R. EVANS.

Witnesses:
S. H. NOURSE,
J. A. BAYLESS.